(12) United States Patent
Chung et al.

(10) Patent No.: US 8,171,427 B2
(45) Date of Patent: May 1, 2012

(54) MOBILE TERMINAL AND CONTROLLING METHOD THEREOF

(75) Inventors: Jin Woo Chung, Seoul (KR); Hyo Jin Suh, Seoul (KR)

(73) Assignee: LG Electronics Inc., Seoul (KR)

( * ) Notice: Subject to any disclaimer, the term of this patent is extended or adjusted under 35 U.S.C. 154(b) by 255 days.

(21) Appl. No.: 12/468,662

(22) Filed: May 19, 2009

(65) Prior Publication Data
US 2010/0058215 A1 Mar. 4, 2010

(30) Foreign Application Priority Data
Aug. 26, 2008 (KR) .................. 10-2008-0083309

(51) Int. Cl.
G06F 3/048 (2006.01)
G06F 3/00 (2006.01)
(52) U.S. Cl. .................. 715/837; 715/765; 715/769
(58) Field of Classification Search .................. 715/769, 715/846, 864, 802, 816, 759, 763–765, 835–839
See application file for complete search history.

(56) References Cited

U.S. PATENT DOCUMENTS

| | | | | |
|---|---|---|---|---|
| 5,479,599 A | * | 12/1995 | Rockwell et al. | 715/837 |
| 5,664,133 A | * | 9/1997 | Malamud et al. | 715/816 |
| 7,478,329 B2 | * | 1/2009 | Stevens et al. | 715/734 |
| 7,694,236 B2 | * | 4/2010 | Gusmorino et al. | 715/838 |
| 7,921,139 B2 | * | 4/2011 | Whitmyer, Jr. | 707/802 |
| 2003/0142125 A1 | * | 7/2003 | Salmimaa et al. | 345/733 |
| 2006/0112354 A1 | * | 5/2006 | Park et al. | 715/835 |
| 2006/0117063 A1 | * | 6/2006 | Havewala et al. | 707/104.1 |
| 2006/0184890 A1 | * | 8/2006 | Altenhofen | 715/764 |
| 2007/0157097 A1 | * | 7/2007 | Peters | 715/764 |
| 2007/0282905 A1 | * | 12/2007 | Karlberg | 707/104.1 |
| 2008/0148182 A1 | * | 6/2008 | Chiang et al. | 715/810 |

OTHER PUBLICATIONS

MyTriniPhone.com, as evidenced by Internet Archive Wayback Machine: http://mytrini-iphone.blogspot.com/2008/01/categories-what-fantastic-app.html, Jan. 15, 2008.*

* cited by examiner

*Primary Examiner* — William Bashore
*Assistant Examiner* — Andrew Tank
(74) *Attorney, Agent, or Firm* — Lee, Hong, Degerman, Kang & Waimey (57) ABSTRACT

A method for controlling a mobile terminal includes displaying icons within a region of a display of the mobile terminal, forming a group icon as being associated with a plurality of the icons, displaying the group icon within the region of the display to permit user access to the plurality of icons which are each associated with the group icon, ceasing the displaying of the plurality of icons which are each associated with the group icon, and generating a menu in response to selection of the group icon, the menu comprising selectable operations individually relating to at least one of the plurality of icons which are each associated with the group icon.

12 Claims, 10 Drawing Sheets

MOBILE TERMINAL AND CONTROLLING METHOD THEREOF

CROSS-REFERENCE TO RELATED APPLICATIONS

Pursuant to 35 U.S.C. §119(a), this application claims the benefit of earlier filing date and right of priority to Korean Application No. 10-2008-0083309, filed on Aug. 26, 2008, the contents of which are hereby incorporated by reference herein in their entirety.

FIELD OF THE INVENTION

The present invention relates to a mobile terminal and controlling method thereof. While the present invention is suitable for a wide scope of applications, it is particularly suitable for displaying and grouping icons on a display of the mobile terminal and controlling the mobile terminal by selecting at least one of the grouped icons.

DISCUSSION OF THE RELATED ART

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to their mobility. The mobile terminals can be further classified into handheld terminals and vehicle mount terminals according to their type of the mobility.

There are ongoing efforts to support and increase the functionality of mobile terminals. Such efforts include software and hardware improvements, as well as changes and improvements in the structural components which form the mobile terminal.

An icon related to specific content is directly displayed on a display unit of a terminal, thereby enabling a user to select the specific content from a plurality of contents more quickly and conveniently. However, due to the limited size of the display unit of the terminal, limitation is put on displaying the plurality of the contents on the display unit. While recent developments may allow contents of various types and contents of the same type to be simultaneously executed, it is difficult to increase the size of the display unit in the terminal. Therefore, a method of efficiently displaying a plurality of icons within the limited space of the display unit is needed.

SUMMARY OF THE INVENTION

In accordance with one embodiment, a method for controlling a mobile terminal includes displaying icons within a region of a display of the mobile terminal, forming a group icon as being associated with a plurality of the icons, displaying the group icon within the region of the display to permit user access to the plurality of icons which are each associated with the group icon, ceasing the displaying of the plurality of icons which are each associated with the group icon, and generating a menu in response to selection of the group icon, the menu comprising selectable operations individually relating to at least one of the plurality of icons which are each associated with the group icon.

In accordance with one embodiment, a mobile terminal includes a display configured to display icons within a region, a user input unit configured to receive an input, and a control unit, wherein the control unit is configured to form a group icon as being associated with a plurality of the icons, display the group icon within the region of the display to permit user access to the plurality of icons which are each associated with the group icon, cease the displaying of the plurality of icons which are each associated with the group icon, and generate a menu in response to selection of the group icon, the menu comprising selectable operations individually relating to at least one of the plurality of icons which are each associated with the group icon.

These and other embodiments will also become readily apparent to those skilled in the art from the following detailed description of the embodiments having reference to the attached figures, the invention not being limited to any particular embodiment disclosed.

BRIEF DESCRIPTION OF THE DRAWINGS

The above and other aspects, features, and advantages of the present invention will become more apparent upon consideration of the following description of preferred embodiments, taken in conjunction with the accompanying drawings.

DETAILED DESCRIPTION OF THE PREFERRED EMBODIMENTS

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The disclosed embodiments can be applicable to various types of terminals. Examples of such terminals include mobile as well as stationary terminals, such as mobile phones, user equipment, smart phones, DTV, computers, digital broadcast terminals, personal digital assistants, portable multimedia players (PMP) and navigators. However, by way of non-limiting example only, further description will be with regard to a mobile terminal 100, and it should be noted that such teachings may apply equally to other types of terminals.

Figure 1:
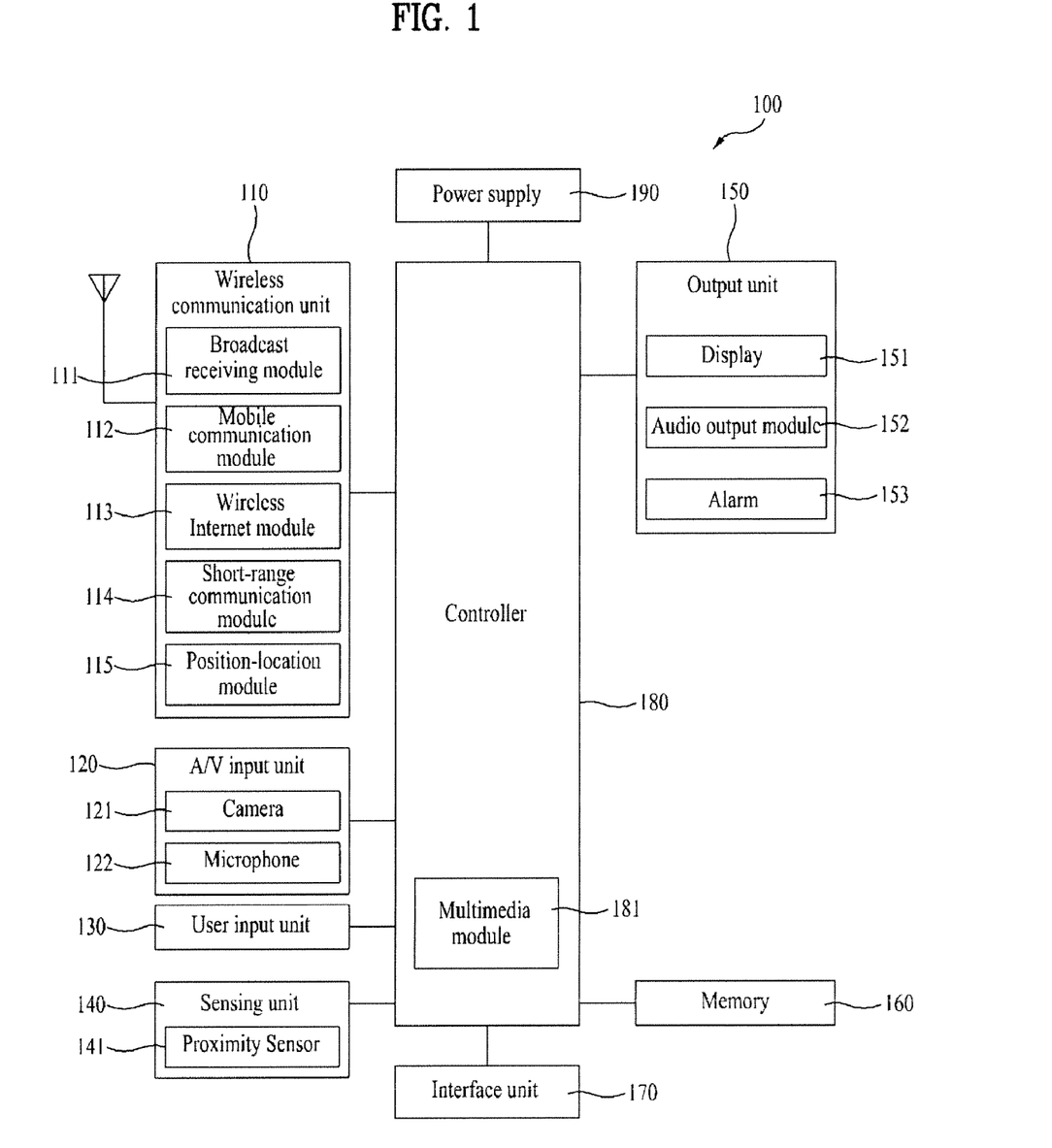
FIG. 1 is a block diagram of a mobile terminal in accordance with an embodiment of the present invention.

FIG. 1 is a block diagram of a mobile terminal 100 in accordance with an embodiment of the present invention. FIG. 1 shows the mobile terminal 100 having various components, but it is understood that implementing all of the illustrated components is not a requirement. Greater or fewer components may alternatively be implemented.

FIG. 1 shows a wireless communication unit 110 configured with several commonly implemented components. For example, the wireless communication unit 110 typically includes one or more components which permit wireless communication between the mobile terminal 100 and a wireless communication system or network within which the mobile terminal is located. In case of non-mobile terminals, the wireless communication unit 110 can be replaced with a wire communication unit. The wireless communication unit 110 and wire communication unit can be commonly referred to as a communication unit.

A broadcast receiving module 111 receives a broadcast signal and/or broadcast associated information from an external broadcast managing entity via a broadcast channel. The broadcast channel may include a satellite channel and a terrestrial channel. The broadcast managing entity generally refers to a system which transmits a broadcast signal and/or broadcast associated information.

Examples of broadcast associated information include information associated with a broadcast channel, a broadcast program, a broadcast service provider, and the like. For example, the broadcast associated information may include an electronic program guide (EPG) of digital multimedia broadcasting (DMB) and an electronic service guide (ESG) of digital video broadcast-handheld (DVB-H).

The broadcast signal may be implemented, for example, as a TV broadcast signal, a radio broadcast signal, and a data broadcast signal. If desired, the broadcast signal may further include a broadcast signal combined with a TV or radio broadcast signal.

The broadcast receiving module 111 may be configured to receive broadcast signals transmitted from various types of broadcast systems. By way of a nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Receiving multicast signals is also possible. If desired, data received by the broadcast receiving module 111 may be stored in a suitable device, such as a memory 160.

A mobile communication module 112 communicates wireless signals with one or more network entities such as a base station or Node-B. Such signals may represent, for example, audio, video, multimedia, control signaling, and data.

A wireless internet module 113 supports Internet access for the mobile terminal 100. This module may be internally or externally coupled to the mobile terminal 100. Suitable technologies for wireless internet may include, but are not limited to, WLAN (Wireless LAN) (Wi-Fi), Wibro (Wireless broadband), Wimax (World Interoperability for Microwave Access), and HSDPA (High Speed Downlink Packet Access). The wireless Internet module can be replaced with a wire Internet module in non-mobile terminals. The wireless Internet module 113 and wire Internet module may be commonly referred to as an Internet module.

A short-range communication module 114 facilitates relatively short-range communications. Suitable technologies for short-range communication may include, but are not limited to, radio frequency identification (RFID), infrared data association (IrDA), ultra-wideband (UWB), as well as the networking technologies commonly referred to as BLUETOOTH and ZIGBEE.

A position-location module 115 identifies or otherwise obtains the location of the mobile terminal 100. This module may be implemented using, for example, global positioning system (GPS) components which cooperate with associated satellites, network components, and combinations thereof.

According to the current technology, the position-location module 115 is able to precisely calculate current 3-dimensional position information based on longitude, latitude and altitude by calculating distance information and precise time information from at least three satellites and then applying triangulation to the calculated information. Currently, location and time information are calculated using three satellites, and errors of the calculated location position and time information are then amended using another satellite. Besides, the position-location module 115 is able to calculate speed information by continuously calculating a real-time current location.

An audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video.

A microphone 122 receives an external audio signal while the portable device is in a particular mode, such as phone call mode, recording mode or voice recognition mode. This audio signal is processed and converted into digital data.

The portable device, and specifically the A/V input unit 120, typically includes assorted noise removing algorithms to remove noise generated in the course of receiving the external audio signal. Data generated by the A/V input unit 120 may be stored in the memory 160, utilized by the output unit 150, or transmitted via one or more modules of communication unit 110. If desired, two or more microphones and/or cameras may be used.

A user input unit 130 generates input data responsive to user manipulation of an associated input device or devices. Examples of such devices include a keypad, a dome switch, a touchpad such as static pressure/capacitance, a jog wheel and a jog switch. A specific example is one in which the user input unit 130 is configured as a touchpad in cooperation with a display 151, which will be described in more detail below.

A sensing unit 140 provides status measurements of various aspects of the mobile terminal 100. For example, the sensing unit 140 may detect an open/close status of the mobile terminal 100, relative positioning of components such as a display 151 and keypad of the mobile terminal, a change of position of the mobile terminal or a component of the mobile terminal, a presence or absence of user contact with the mobile terminal, orientation or acceleration/deceleration of the mobile terminal.

If the mobile terminal 100 is configured as a slide-type mobile terminal, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device.

An interface unit 170 is often implemented to couple the mobile terminal 100 with external devices. Typical external devices include wired/wireless headphones, external chargers, power supplies, storage devices configured to store data such as audio, video, and pictures, as well as earphones and microphones. The interface unit 170 may be configured using a wired/wireless data port, audio input/output ports, video input/output port, a card socket for coupling to a memory card, a subscriber identity module (SIM) card, a user identity module (UIM) card, or removable user identity module (RUIM) card.

When the mobile terminal 100 is connected to an external cradle, the interface unit 170 becomes a passage for supplying the mobile terminal with a power from the cradle or a passage for delivering various command signals inputted from the cradle by a user to the mobile terminal. Each of the various command signals inputted from the cradle or the power can operate as a signal enabling the mobile terminal 100 to recognize that it is correctly loaded in the cradle.

An output unit 150 generally includes various components that support the output requirements of the mobile terminal 100. A display 151 is typically implemented to visually display information associated with the mobile terminal. For example, if the mobile terminal 100 is operating in a phone call mode, the display 151 will generally provide a user interface or graphical user interface that includes information associated with placing, conducting, and terminating a phone call. As another example, if the mobile terminal 100 is in a video call mode or a photographing mode, the display 151 may additionally or alternatively display images associated with these modes.

One particular implementation includes the display 151 configured as a touch screen working in cooperation with an input device, such as a touchpad. This configuration permits the display 151 to function both as an output device and an input device.

The display 151 may be implemented using known display technologies including a liquid crystal display (LCD), a thin film transistor-liquid crystal display (TFT-LCD), an organic light-emitting diode display (OLED), a flexible display and a three-dimensional display. The mobile terminal 100 may include one or more of displays 151. An example of a two-display embodiment is one in which one display 151 is configured as an internal display viewable when the mobile terminal 100 is in an opened position and a second display 151 is configured as an external display viewable in both the open and closed positions.

The touchscreen can be configured to detect a touch input pressure as well as a touch input position and size. Further, a proximity sensor 141 can be provided within or around the touchscreen. The proximity sensor 141 detects an object approaching a prescribed detecting surface or a presence or non-presence of an object existing around itself using an electromagnetic power or infrared rays without mechanical contact. Hence, the proximity sensor 141 is superior to a contact sensor in lifespan and utilization.

An example for an operational principle of the proximity sensor 141 is explained as follows. First of all, if an object approaches a sensor detecting surface while an oscillation circuit oscillates a sine radio frequency, an oscillation amplitude of the oscillation circuit attenuates or stops. This change is converted to an electric signal to detect a presence or non-presence of the object. Thus, even if any material except a metallic material comes between the RF oscillation proximity sensor and the object, a proximity switch is able to detect the object to detect without interference with the material.

In spite of not providing the proximity sensor 141, if the touchscreen is electrostatic, it can be configured to detect the proximity of a pointer through an electric field change attributed to the proximity of the pointer. In the case that the pointer is placed in the vicinity of the touchscreen without being actually contacted with the touchscreen, it is able to detect a position of the pointer and a distance between the pointer and the touchscreen. For clarity and convenience of explanation, an action for enabling the pointer approaching the touchscreen to be recognized as placed on the touchscreen is named 'proximity touch' and an action of enabling the pointer to actually come into contact with the touchscreen is named 'contact touch'. A position at which the proximity touch is made to the touchscreen using the pointer refers to a position of the pointer vertically corresponding to the touchscreen when the pointer makes the proximity touch.

If the proximity sensor 141 is used, it is able to sense a proximity touch and its pattern including proximity touch distance, proximity touch direction, proximity touch speed, proximity touch position, proximity touch moving state, and the like. It is also able to output information corresponding to the sensed proximity touch action and the proximity touch pattern to the touchscreen.

FIG. 1 further shows the output unit 150 having an audio output module 152 which supports the audio output requirements of the mobile terminal 100. The audio output module 152 is often implemented using one or more speakers, buzzers, other audio producing devices, and combinations thereof.

The audio output module 152 functions in various modes such as call-receiving mode, call-placing mode, recording mode, voice recognition mode and broadcast reception mode. During operation, the audio output module 152 outputs audio relating to a particular function or status, such as call received, message received, or errors.

The output unit 150 is further shown having an alarm 153, which is commonly used to signal or otherwise identify the occurrence of a particular event associated with the mobile terminal 100. Typical events include call received, message received and user input received.

An example of a signal provided by the output unit 150 is tactile sensation. For example, the alarm 153 may be configured to vibrate responsive to the mobile terminal 100 receiving a call or message. As another example, vibration is provided by the alarm 153 responsive to receiving user input at the mobile terminal 100, thereby providing a tactile feedback mechanism. It is understood that the various signals provided by the components of output unit 150 may be separately performed or performed using any combination of such components.

A memory 160 is generally used to store various types of data to support the processing, control, and storage requirements of the mobile terminal 100. Examples of such data include program instructions for applications operating on the mobile terminal 100, contact data, phonebook data, messages, pictures, and video. Moreover, data for various patterns of vibration and/or sound outputted in the case of a touch input to the touchscreen can be stored in the memory 160.

As map information can be stored in the memory 160, user's convenience can be further provided in a manner of providing the map information to a user if necessary. Moreover, a recent use history or a cumulative use frequency of each menu in the mobile terminal 100 can be stored in the memory 160.

The memory 160 shown in FIG. 1 may be implemented using any type or combination of suitable volatile and non-volatile memory or storage devices including random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, or other similar memory or data storage device.

A controller 180 typically controls the overall operations of the mobile terminal 100. For example, the controller 180 performs the control and processing associated with voice calls, data communications, instant message communication, video calls, camera operations and recording operations.

The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input and a picture drawing input carried out on the touchscreen as characters or images, respectively. In addition, the controller 180 can do TTS (Text to Speech) or STT (Speech to Text) conversion which converts text to speech or converts speech to text respectively.

A power supply 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In some cases, such embodiments may also be implemented by controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

The mobile terminal 100 may be implemented in a variety of different configurations. Examples of such configurations include folder-type, slide-type, bar-type, rotational-type, swing-type and combinations thereof. For clarity, further disclosure will primarily relate to a slide-type mobile terminal 100. However, such teachings apply equally to other types of mobile terminals.

Figure 2:
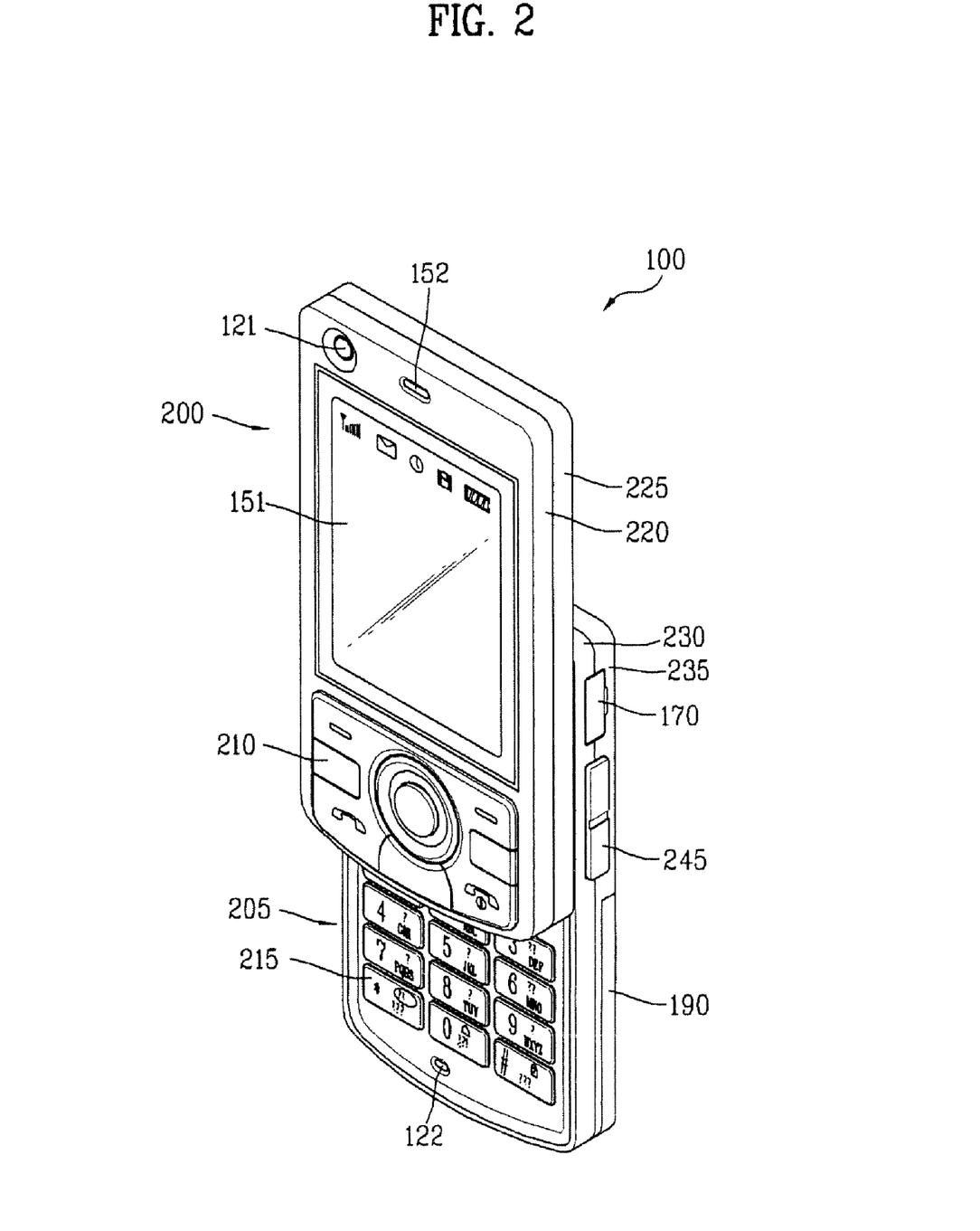
FIG. 2 is a perspective diagram of a front side of a mobile terminal according to an embodiment of the present invention.

FIG. 2 is a perspective view of a front side of a mobile terminal 100 according to an embodiment of the present invention. In FIG. 2, the mobile terminal 100 is shown having a first body 200 configured to slidably cooperate with a second body 205.

The user input unit 130 described in FIG. 1 may include a first input unit such as function keys and four directional keys 210, a second input unit such as keypad 215 and a third input unit such as side keys 245. The function keys 210 are associated with the first body 200, and the keypad 215 is associated with the second body 205. The keypad 215 includes various keys such as numbers, characters, and symbols to enable a user to place a call, prepare a text or multimedia message, and otherwise operate the mobile terminal 100.

The first body 200 slides relative to the second body 205 between open and closed positions. Although not shown in drawings, in the case of a folder-type mobile terminal, a first body thereof folds and unfolds relative to a second body thereof between open and closed positions. In addition, in the case of a swing-type mobile terminal, a first body thereof swings relative to a second body thereof between open and closed positions.

In the closed position, the first body 200 is positioned over the second body 205 in such a manner that the keypad 215 is substantially or completely obscured by the first body 200. In the open position, user access to the keypad 215 is possible. The function keys 210 are conveniently configured for a user to enter commands such as start, stop and scroll.

The mobile terminal 100 is operable in either a standby mode, in which it is able to receive a call or message and to receive and respond to network control signaling or an active call mode. Typically, the mobile terminal 100 functions in the standby mode in the closed position and in an active mode in the open position. This mode configuration may be changed as required or desired.

The first body 200 is shown formed from a first case 220 and a second case 225. The second body 205 is shown formed from a first case 230 and a second case 235. The first case 230 and second case 235 are usually formed from a suitably rigid material, such as injection molded plastic, or formed using metallic material, such as stainless steel (STS) and titanium (Ti).

One or more intermediate cases may be provided between the first case 220/230 and second case 225/235 of one or both of the first body 200 and second body 205. The first body 200 and second body 205 are typically sized to receive electronic components necessary to support operation of the mobile terminal 100.

The first body 200 is shown having a camera 121 and audio output unit 152, which is configured as a speaker, positioned relative to the display 151. The camera 121 may be constructed such that it can be selectively positioned relative to the first body 200 such as by rotation or swiveling.

The function keys 210 are positioned adjacent to a lower side of the display 151, which is shown implemented as an LCD or OLED. The display 151 may also be configured as a touch screen having an underlying touchpad which generates signals responsive to user contact with the touchscreen, such as with a finger or stylus.

The second body 205 is shown having a microphone 122 positioned adjacent to the keypad 215 and having side keys 245, which are one type of a user input unit as mentioned above, positioned along the side of second body 205. Preferably, the side keys 245 may be configured as hot keys, such that the side keys are associated with a particular function of the mobile terminal 100. An interface unit 170 is shown positioned adjacent to the side keys 245, and a power supply 190 in a form of a battery is shown located on a lower portion of the second body 205.

Figure 3:
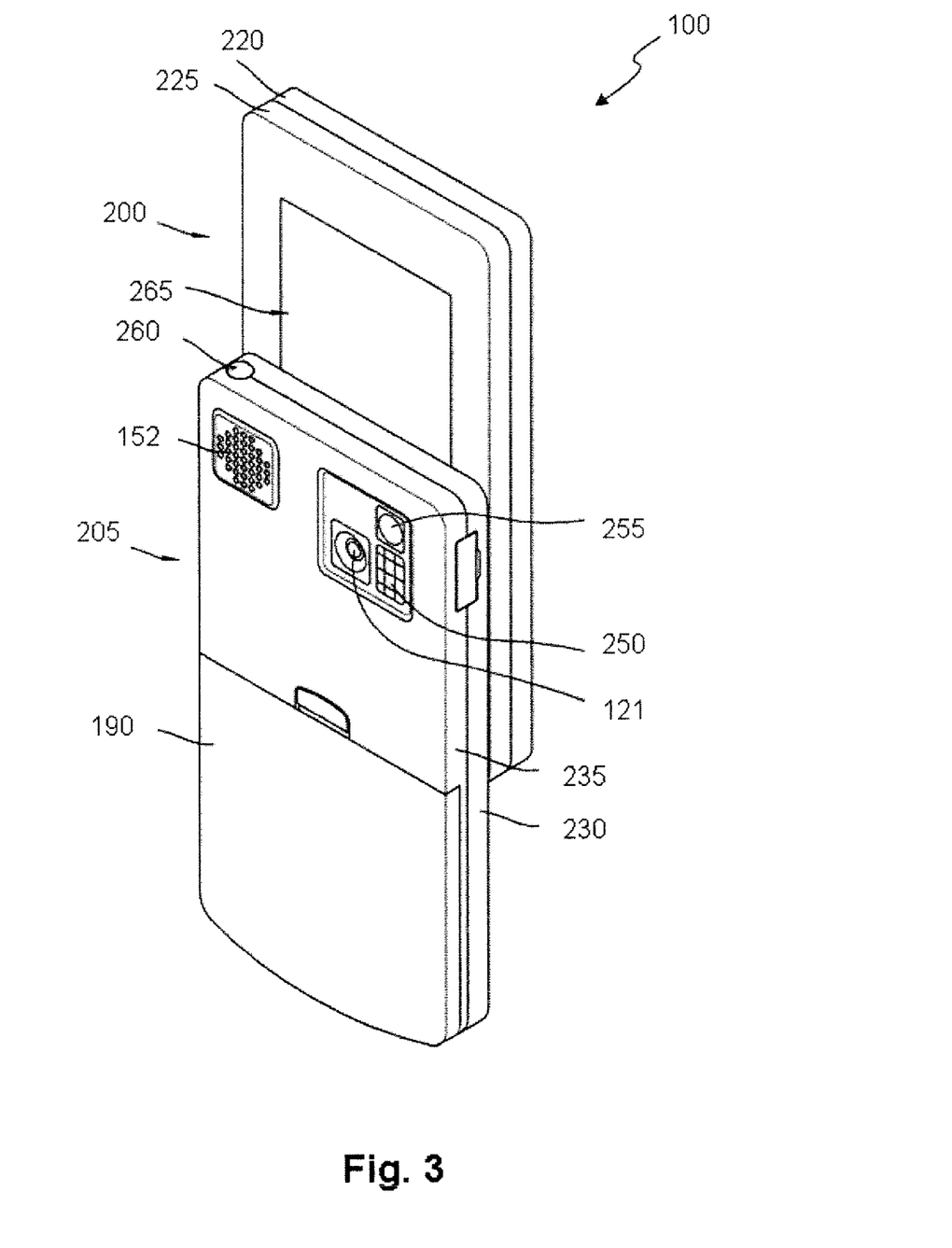
FIG. 3 is a perspective diagram of a backside of the mobile terminal shown in FIG. 2.

FIG. 3 is a rear view of the mobile terminal 100 shown in FIG. 2. FIG. 3 shows the second body 205 having a camera 121 with an associated flash 250 and mirror 255. The flash 250 operates in conjunction with the camera 121. The mirror 255 is useful for assisting a user to position the camera 121 in a self-portrait mode.

The camera 121 of the second body 205 faces a direction which is opposite to a direction faced by the camera 121 of the first body 200 shown in FIG. 2. Each of the cameras 121 of the first body 200 and second body 205 may have the same or different capabilities.

In an embodiment, the camera 121 of the first body 200 operates with a relatively lower resolution than the camera 121 of the second body 205. Such an arrangement works well during a video conference, for example, in which reverse link bandwidth capabilities may be limited. The relatively higher resolution of the camera 121 of the second body 205, as shown in FIG. 3, is useful for obtaining higher quality pictures for later use or for communicating with other parties.

The second body 205 also includes an audio output module 152 located on an upper side of the second body and configured as a speaker. The audio output modules 152 of the first body 200 and second body 205 may cooperate to provide stereo output. Moreover, either or both of these audio output modules 152 may be configured to operate as a speakerphone.

A broadcast signal receiving antenna 260 is shown located at an upper end of the second body 205. The antenna 260 functions in cooperation with the broadcast receiving module 111 shown in FIG. 1. The antenna 260 may be fixed or configured to retract into the second body 205. The rear side of the first body 200 includes a slide module 265, which slidably couples with a corresponding slide module located on the front side of the second body 205.

It is understood that the illustrated arrangement of the various components of the first body 200 and second body 205 may be modified as required or desired. In general, some or all of the components of one body may alternatively be implemented on the other body. In addition, the location and relative positioning of such components are not critical to many embodiments, and therefore, the components may be positioned at locations which differ from those shown by the representative figures.

The mobile terminal 100 of FIGS. 1-3 may be configured to operate within a communication system which transmits data via frames or packets, including both wireless and wired communication systems, and satellite-based communication systems. Such communication systems utilize different air interfaces and/or physical layers.

Examples of air interfaces utilized by the communication systems include frequency division multiple access (FDMA), time division multiple access (TDMA), code division multiple access (CDMA), the universal mobile telecommunications system (UMTS), the long term evolution (LTE) of the UMTS, and the global system for mobile communications (GSM). By way of a non-limiting example only, further description will relate to a CDMA communication system, but such teachings apply equally to other system types.

Figure 4:
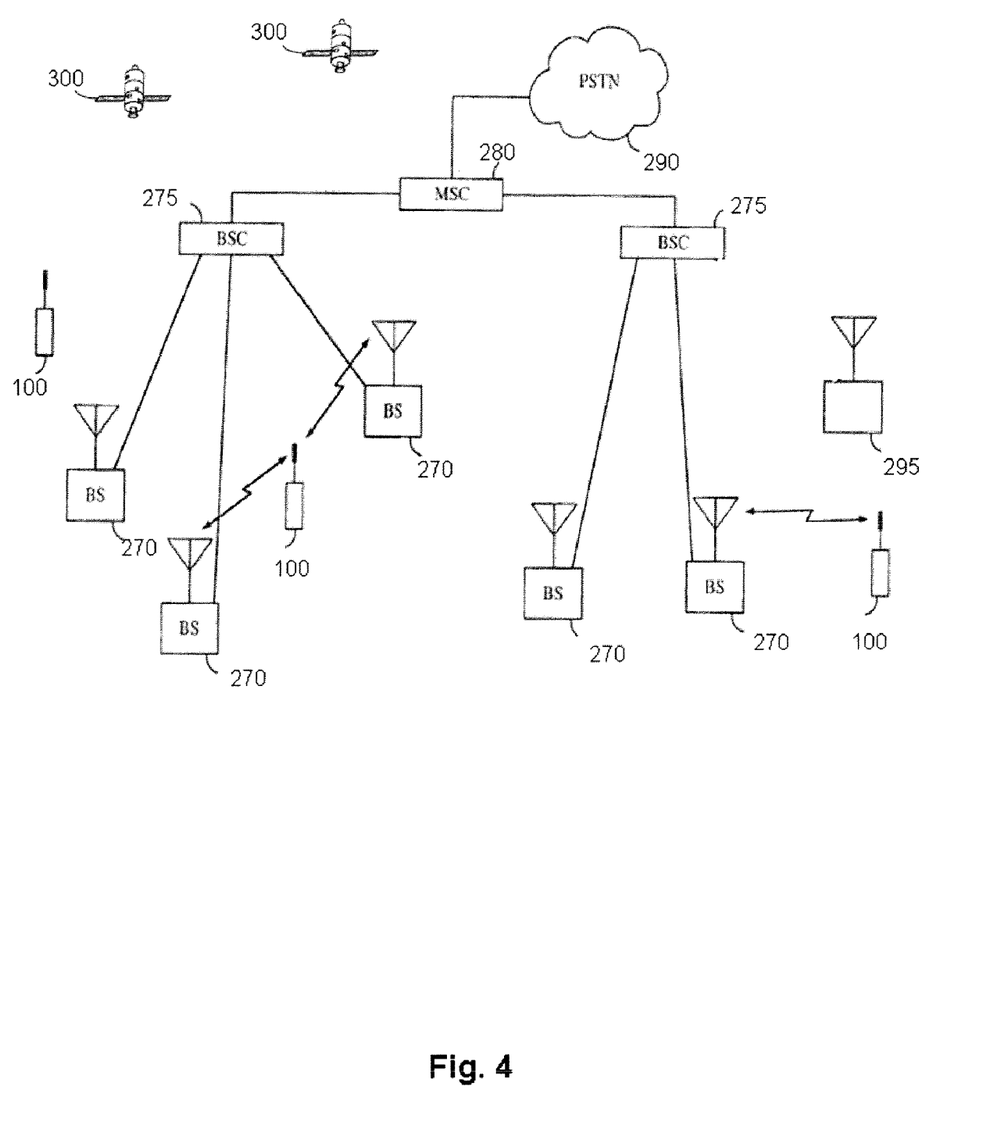
FIG. 4 is a block diagram of a wireless communication system in which a mobile terminal according to an embodiment of the present invention is operable.

Referring to FIG. 4, a CDMA wireless communication system is shown having a plurality of mobile terminals 100, a plurality of base stations 270, a plurality of base station controllers (BSCs) 275, and a mobile switching center (MSC) 280. The MSC 280 is configured to interface with a conventional public switch telephone network (PSTN) 290. The MSC 280 is also configured to interface with the BSCs 275.

The BSCs 275 are coupled to the base stations 270 via backhaul lines. The backhaul lines may be configured in accordance with any of several known interfaces including, for example, E1/T1, ATM, IP, PPP, Frame Relay, HDSL, ADSL, or xDSL. It is to be understood that the system may include more than two BSCs 275.

Each base station 270 may include one or more sectors, each sector having an omnidirectional antenna or an antenna pointed in a particular direction radially away from the base station 270. Alternatively, each sector may include two antennas for diversity reception. Each base station 270 may be configured to support a plurality of frequency assignments, with each frequency assignment having a particular spectrum, for example, 1.25 MHz or 5 MHz The intersection of a sector and frequency assignment may be referred to as a CDMA channel. The base stations 270 may also be referred to as base station transceiver subsystems (BTSs). In some cases, the term "base station" may be used to refer collectively to a BSC 275, and one or more base stations 270. The base stations 270 may also be denoted as "cell sites." Alternatively, individual sectors of a given base station 270 may be referred to as cell sites.

A terrestrial digital multimedia broadcasting (DMB) transmitter 295 is shown broadcasting to mobile terminals 100 operating within the system. The broadcast receiving module 111, shown in FIG. 1, of the mobile terminal 100 is typically configured to receive broadcast signals transmitted by the DMB transmitter 295. Similar arrangements may be implemented for other types of broadcast and multicast signaling as discussed above.

FIG. 4 further depicts several global positioning system (GPS) satellites 300. Such satellites facilitate locating the position of some or all of the mobile terminals 100. Two satellites are depicted, but it is understood that useful positioning information may be obtained with greater or fewer satellites.

The position-location module 115, shown in FIG. 1, of the mobile terminal 100 is typically configured to cooperate with the satellites 300 to obtain desired position information. It is to be appreciated that other types of position detection technology, such as location technology that may be used in addition to or instead of GPS location technology, may alternatively be implemented. Some or all of the GPS satellites 300 may alternatively or additionally be configured to provide satellite DMB transmissions.

During typical operation of the wireless communication system the base stations 270 receive sets of reverse-link signals from various mobile terminals 100. The mobile terminals 100 engage in calls, messaging, and other communications.

Each reverse-link signal received by a given base station 270 is processed within that base station 270. The resulting data is forwarded to an associated BSC 275.

The BSC 275 provides call resource allocation and mobility management functionality including soft handoffs between the base stations 270. The BSCs 275 also route the received data to the MSC 280, which provides additional routing services for interfacing with the PSTN 290.

Similarly, the PSTN interfaces with the MSC 280, and the MSC 280 interfaces with the BSCs 275. The BSCs 275 control the base stations 270 to transmit sets of forward-link signals to the mobile terminals 100.

In the following description, a control method applicable to the above-configured mobile terminal 100 is explained with respect to various embodiments. It is understood that the following embodiments can be implemented independently or through combinations thereof.

Figure 5:
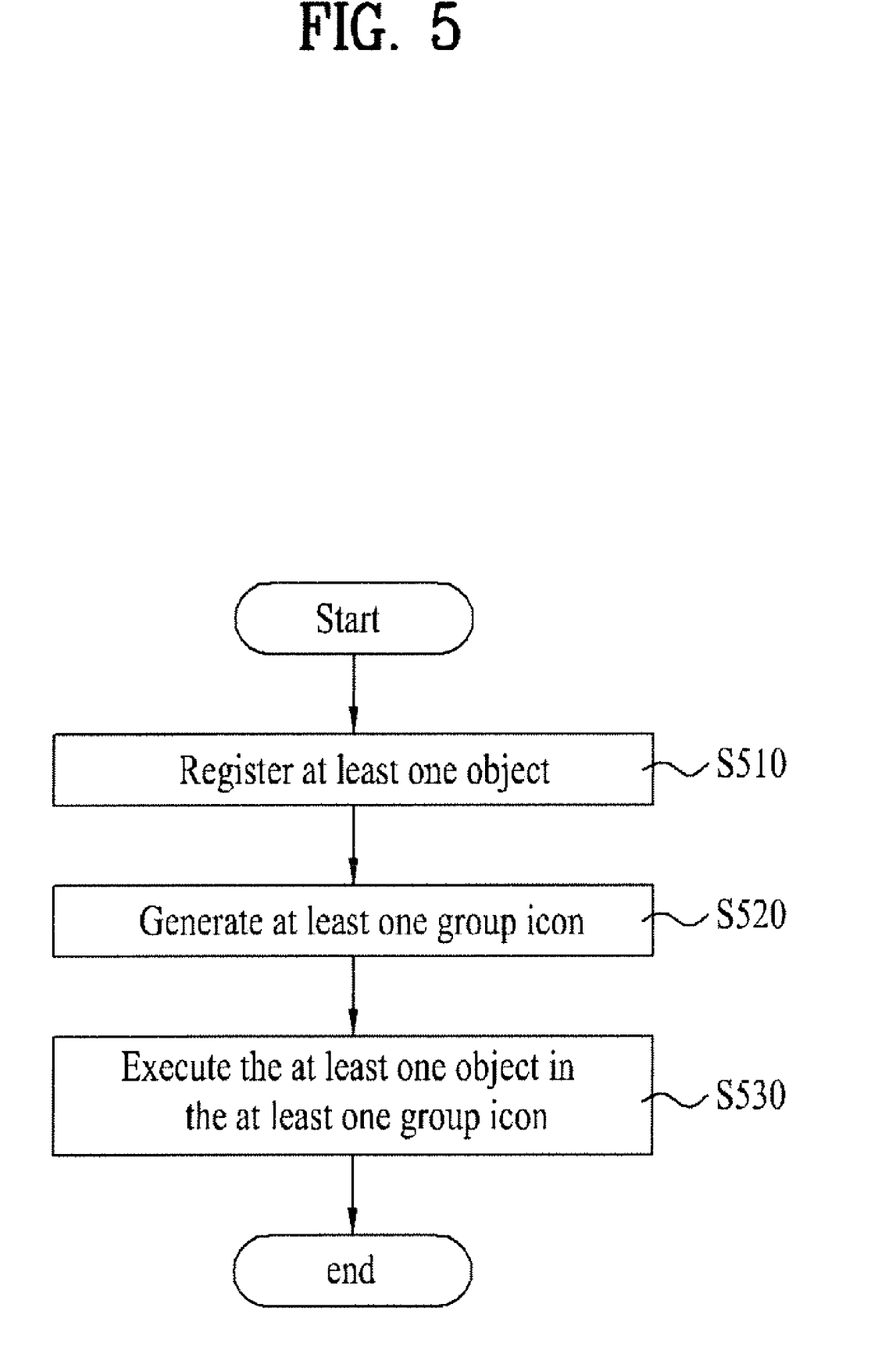
FIG. 5 is a flowchart illustrating controlling a mobile terminal according an embodiment of the present invention.

Referring to FIG. 5, a user is able to register an icon relevant to at least one object to the display 151. In this case, a screen of the display 151 may be in a standby mode or a communication (audio or data communication) mode.

When content is processed by the controller 180 of the mobile terminal 100, an object refers to the processed object in the controller 180 for the corresponding content. For example, a type of the content includes a multimedia type of content such as music, moving picture, image or the like or a terminal-usable content type such as game, Internet link, document file or the like.

An object for content can be displayed as an icon in a graphic form for facilitating user's recognition in the display 151. For specific type content, a representative icon representing the specific type is provided. A mark for identifying an object for contents of the same type can be added to the representative icon.

In the following description, in the absence of any special explanations, an object refers to an iconized object. Yet, it is not mandatory for an object to be iconized in the present invention. A method for representing an object can be modified by a user or a manufacturer.

As mentioned in the foregoing description, when the display 151 is in a specific mode, a user is able to register at least one object. In this case, registering an object means that an iconized object is displayed on the display 151 such that execution of a specific content relevant to the object can be performed through a user's selection of the object.

The specific mode of the display 151 means that a current mode of the display is a standby mode, a call mode or the like. For example, when the display 151 is in the standby mode, at least one object can be registered. Yet, in the case of a currently applied mode such as a call mode and the like (when power-on), registration of any object is possible according to user's necessity.

Figure 6:
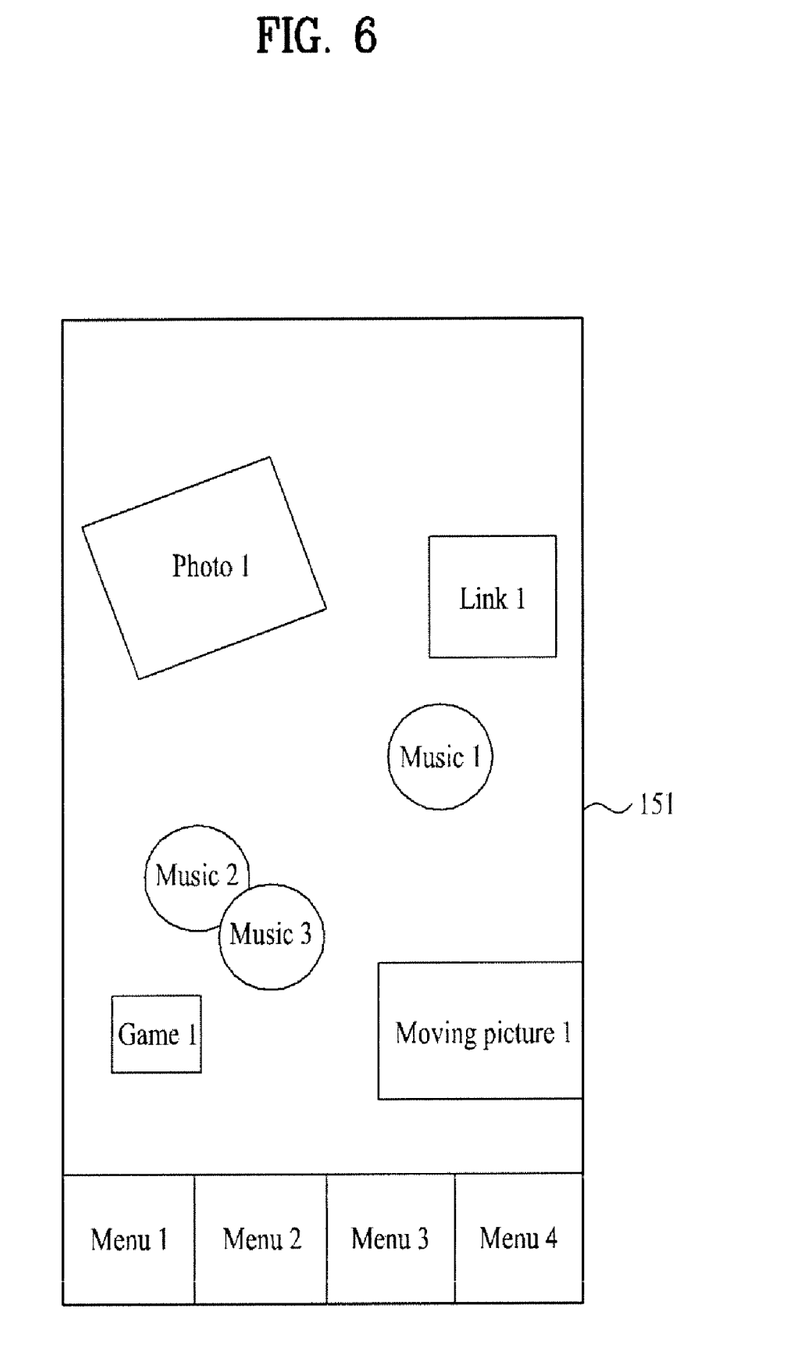
FIG. 6 shows that a plurality of objects are registered to a display unit of a mobile terminal according to an embodiment of the present invention.

Referring to FIG. 6, a user registers at least one object to the display 151 in a specific mode (S510). For example, an object for moving picture content, objects for music contents, an object for a game content, an object for Internet link content and the like are registered to the display 151 in a standby mode as shown in FIG. 6. When a user attempts to register a plurality of objects, limitation may be put on the registration due to a limited size of the display 151. To solve this problem, a plurality of objects can be registered by being grouped. In particular, if a plurality of objects are registered, while each of the plurality of objects is not displayed on the display 151, they can be represented by a group icon.

In one aspect of the present invention, while each of the plurality of objects is registered, when at least a predetermined number of objects are overlapped with each other at least in part, the overlapped icons can be represented as a group icon. In the following description, generating a group icon is explained in detail.

Firstly, when generating a group icon, at least two or more objects are mutually overlapped with each other at least in part such that the overlapped shape can be represented as a group icon. In order to overlap objects with each other, the objects on the display 151 are activated via the user input unit 130 such as a keypad and the activated objects are rendered into a single group. Alternatively, in the case when a display module for driving the display 151 supports a touchscreen, objects can be overlapped with each other by a drag using a touch pen or the like.

Secondly, if a number of objects are registered, a group icon is automatically generated. For example, if a predetermined number or threshold of objects of the same type are registered, a group icon for the corresponding objects can be automatically generated. Moreover, even in the case when objects differ from each other in type, a group icon can be generated in the same manner.

In the case of the group icon for the group includes objects of the same type, the group icon can be generated to facilitate a user to recognize content type indicated by the corresponding group icon. For example, a group icon for a group including music objects is generated and the type of the included object is indicated, for example, by a musical note for the music objects. In the case when objects differing in type are included, a group icon can be generated such that group icons for the respective object types are displayed at least in part. For example, a group icon for a group including music content, image content and an Internet link can be generated and the group icon can be indicated by a musical note, a picture frame and an Internet link mark.

According to one of the above described methods, a user can generate at least one group icon for at least two objects (S520). The user selects the at least one group icon displayed on the display 151 and then executes the at least one object included in the selected group icon (S530).

In a scheme for selecting the group icon, the group icon is selected by manipulating a relevant key via the user input unit 130 such as a keypad. Alternatively, if the display 151 supports a touchscreen, a user is able to touch the corresponding group icon using a touch pen or the like.

When the group icon is selected, if the group icon includes the objects of the same type, the corresponding objects can be sequentially executed. For example, if the object is music content, it can be executed in a random order or in a sequential order, such as an alphabetic order, preset by a user. In the case of an image or moving picture content, it can be sequentially executed in the above mentioned order. With regard to the execution of the objects represented by the selected group icon, an execution method is determined according to characteristics of the content indicated by the corresponding object or it can be determined by a user.

With regard to the execution of the objects represented by the selected group icon, an executing method is determined according to characteristics of the content indicated by the corresponding object or can be determined by a user. In the case when objects differing in type are included, they can be executed simultaneously or sequentially according to the characteristic of the relevant content. For example, in the case when objects included in the selected group include the image contents of the same type only, an image slide show can be executed sequentially or in a random order.

In the case when objects included in the selected group are of different types, for example, image contents and music contents, they can be displayed such that an image slide show is executed as soon as music is executed in a specific or random order.

Unlike this, if a group icon including objects differing from each other in type is selected, menus executable according to contents of the objects included in the selected group icon are presented or displayed such that a user can execute a desirable menu. This will be explained with reference to FIG. 8 below.

Figure 7:
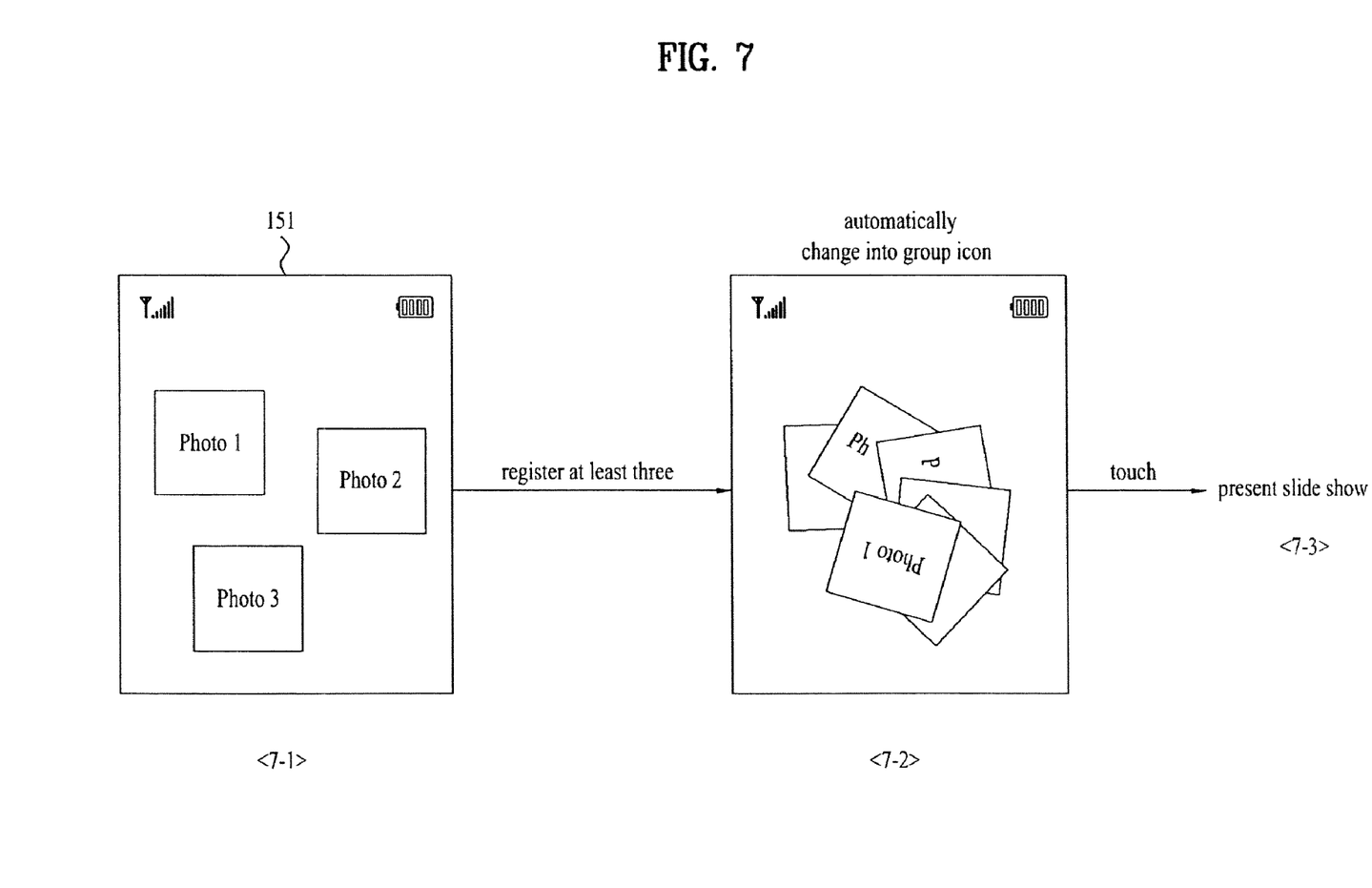
FIG. 7 shows generating and executing a group icon according to an embodiment of the present invention.

Referring to FIG. 7, when three icons relevant to image objects are registered to the display 151 that supports a touchscreen, the display 151 can be in a standby more or a call mode. In particular, according to an embodiment shown in FIG. 7, when at least three objects of the same type are registered to the display 151, a group icon relevant to these objects are automatically generated.

Referring to (7-1) of FIG. 7, three objects are registered to the display 151. In the case when a predetermined number of objects, for example, at least three or more objects, which is predetermined by a user or a mobile terminal manufacturer, is registered, a group icon is generated, as shown in (7-2) of FIG. 7, in a manner that the objects are overlapped with one another. In one aspect of the present invention, a group icon in a different shape can be generated according to a scheme of use.

If the user selects the group icon, the controller 180 of the mobile terminal 100 executes the objects by a scheme preset according to a type of the objects included in a group indicated by the group icon. For example, an image slide show is executed for the image objects (Photos 1-3), as shown in (7-3) of FIG. 7.

According to the embodiment exemplified in FIG. 8, a user generates a group icon such that objects differing from each other in types, for example, photo and Internet link, are overlapped with each other in response to the user's touch and drag action with a finger or a pointer and subsequently, the generated icon is selected. Referring to (8-1) of FIG. 8, a user drags an icon 810 of an Internet link object registered to the display 151 to an icon 820 of an image object such that the objects can be overlapped with each other, as shown in (8-2) of FIG. 8. Since the objects differ from each other in type, they are represented as a package type group icon 830 as shown in (8-3) of FIG. 8. The user may assign a group icon name, for example, "shopping" to the group icon 830, as shown in (8-3) of FIG. 8.

Figure 8:
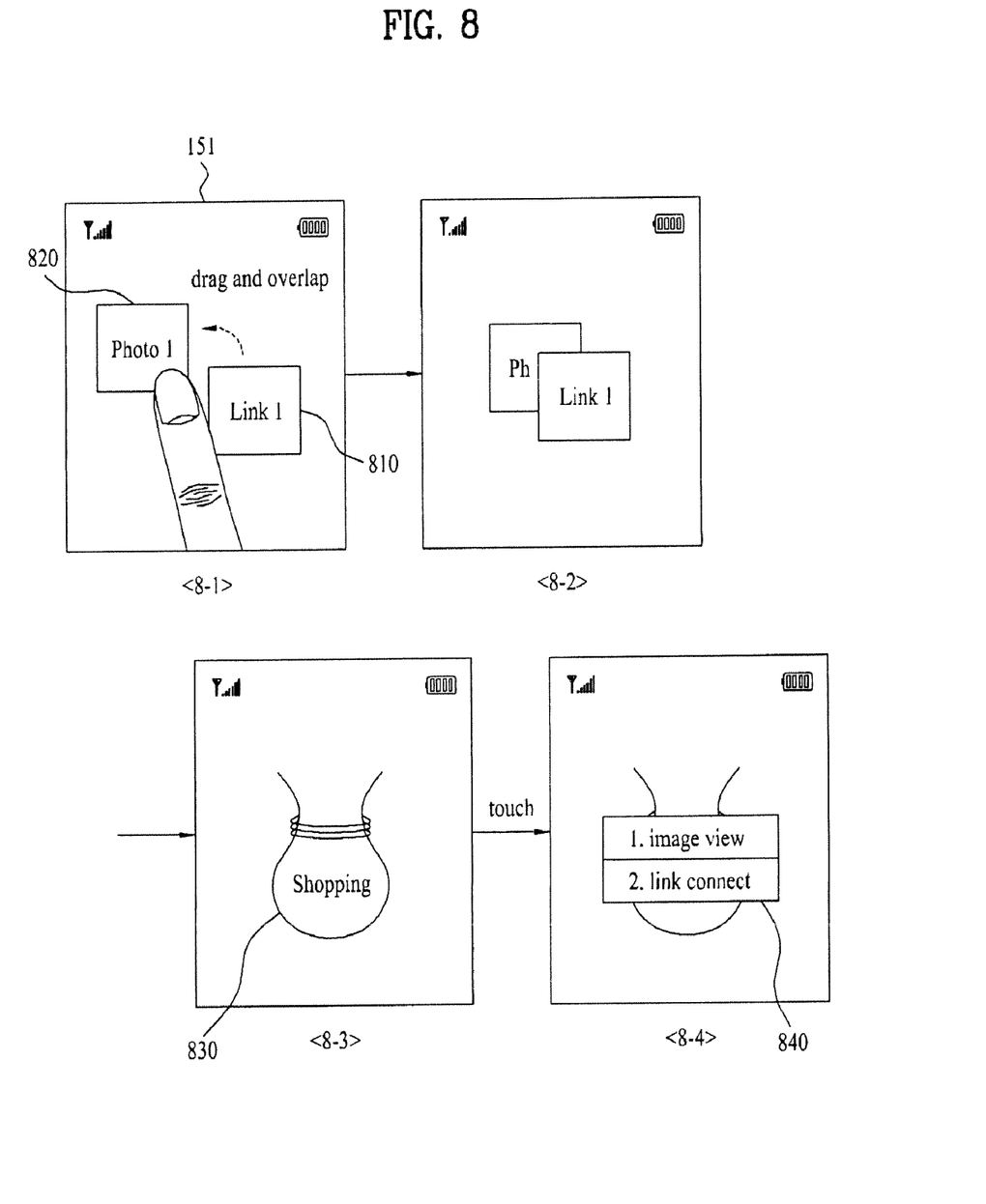
FIG. 8 shows generating and executing a group icon according to an embodiment of the present invention.

In the case when the user selects the group icon by a touch or the like, the controller 180 of the mobile terminal 100 is able to present methods executable for the objects within the current group icon to a user in a manner of a menu 840, as shown in (8-4) of FIG. 8. With regard to this, in the embodiment exemplified in FIG. 8, an image view submenu is provided for executing an image object and a link connect submenu is provided for executing an internet link object in the menu assigned to the corresponding group icon.

As described above, the user is able to determine the menu assigning method when the group icon generated by selecting the executing method allowed for the object by the controller 180 is selected. In particular, if an object is relevant to music content, a submenu for music listening can be assigned to a menu executable for the selected group icon. If an object is relevant to document content, a document view submenu can be assigned to a menu executable for the selected group icon. If an object is relevant to game content, a game execute submenu can be assigned to a menu executable for the selected group icon. If an object is relevant to moving picture content, a moving picture view submenu can be assigned to a menu executable for the selected group icon.

Figure 9:
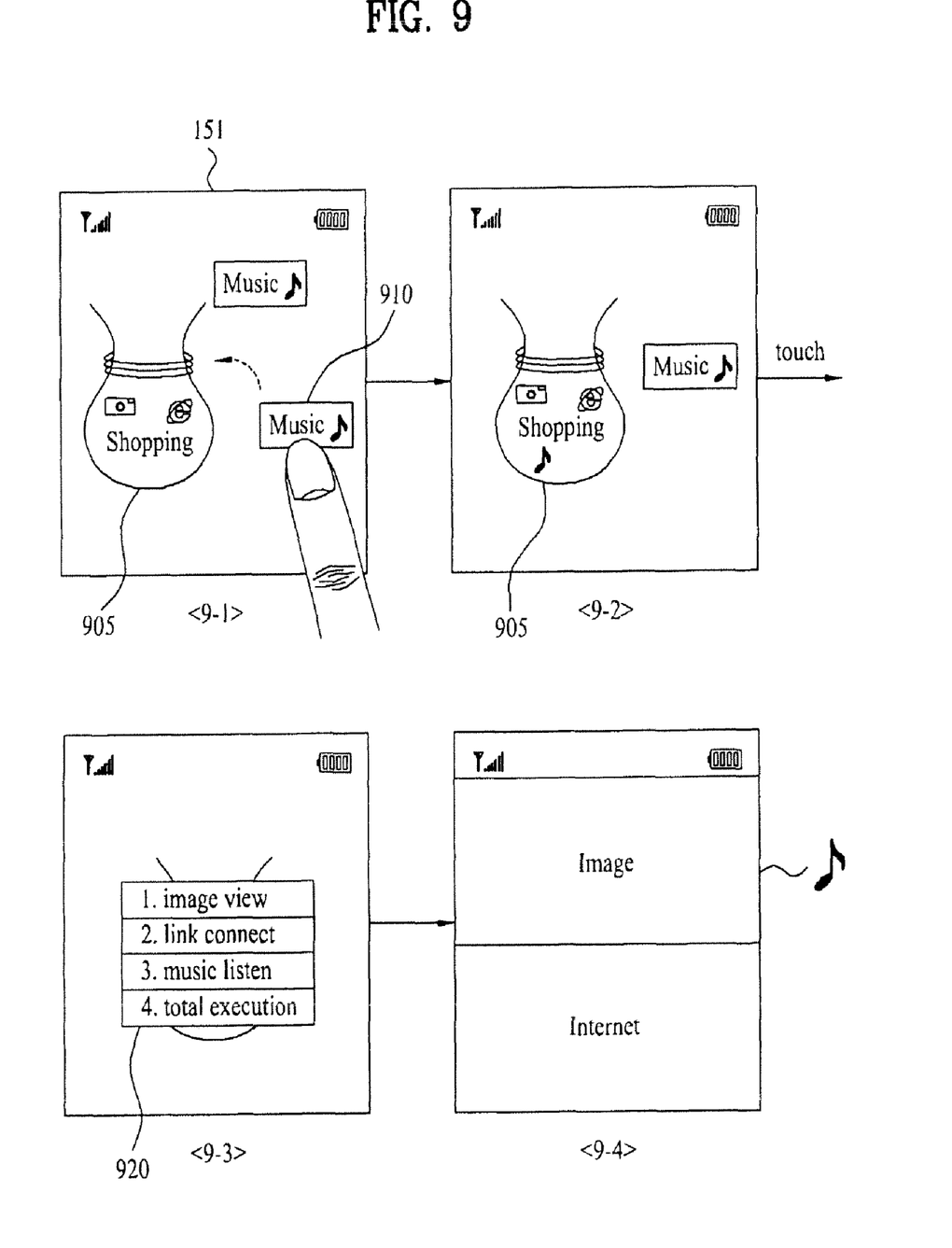
FIG. 9 shows generating and executing a group icon according to an embodiment of the present invention.
Figure 10:
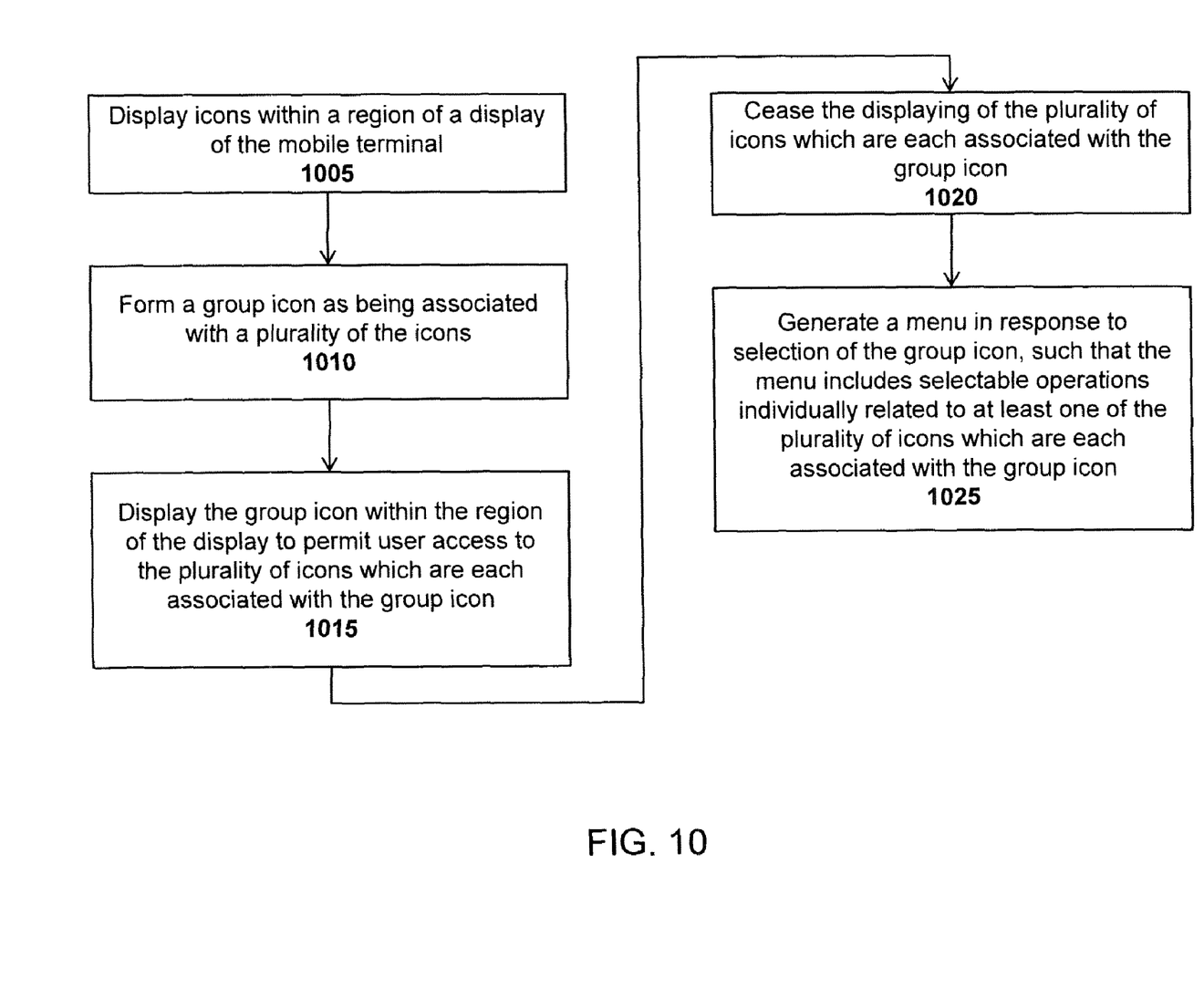
FIG. 10 is a flowchart illustrating controlling a mobile terminal according to an embodiment of the present invention.

FIG. 9 illustrates generating and executing a group icon according to an embodiment of the present invention. The embodiment shown in FIG. 9 is similar to the embodiment illustrated in FIG. 8.

In the same manner as represented in (8-3) of FIG. 8, a user adds an object 910 for music content or music object to a group icon 905 including a single image object and a single Internet link object. Specifically, the user drags the music object 910 to add the same to the previously generated group icon 905.

The embodiment illustrated in FIG. 9 relates to a case when the group icon includes a symbol for content type included in the group icon. In particular, since the group represented as the group icon 905 with the name "shopping" includes the image object, a camera symbol is assigned to the group icon. Since the group represented by the group icon 905 in the name of "shopping" also includes the Internet link object, an icon symbol for an Internet executing program is additionally given to the group icon. Thereafter, since a music object is added as shown in (9-1) of FIG. 9, a musical note symbol is further added to the group icon 905, as shown in (9-2) of FIG. 9.

Subsequently, if the user selects the group icon 905 by touching the group icon 905, a menu 920 relevant to an execution scheme of the objects included in the corresponding group is represented in the group icon, as shown in (9-3) of FIG. 9. For example, the menu 920 is displayed overlapping over the group icon 905. The represented position of the menu 920 can be modified by a user's setup or the like.

According to the embodiment illustrated in FIG. 9, unlike the case shown in FIG. 8, a submenu "4. Total execution" for executing the objects included in the group icon 905 simultaneously is further included, as shown in (9-3) of FIG. 9. If the user selects the total execution submenu, the images are displayed on one of the partitioned portions of the display 151. In particular, an image is displayed at a top portion of the display 151 and an Internet link is displayed at a bottom portion of the display, as shown in (9-4) of FIG. 9, while music is played. In this case, the partitioning scheme of the display 151 can be modified by a user's setup or the like.

It will be apparent to those skilled in the art that the present invention can be specified into another form without departing from the spirit or scope of the inventions. For example, the above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). The computer can include the controller 180 of the mobile terminal 100.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for controlling a mobile terminal, the method comprising:
    displaying a group icon which is associated with a first icon and a second icon;
    receiving an input for the group icon;
    determining a group action associated with the first icon and the second icon according to whether a first file type associated with the first icon and a second file type associated with the second icon are a same type or not; and
    executing the group action in response to the received input,
    wherein the determining comprises:
    when the first file type and the second file type are the same type, the group action is determined as an action that sequentially executes functionality associated with the first icon and the second icon, and
    when the first file type and the second file type are not the same type, the group action is determined as an action that simultaneously executes functionality associated with the first icon and functionality associated with the second icon.

2. The method of claim 1, wherein a menu comprising a list of applications associated with the first icon and the second icon is displayed in response to execution of the group.

3. The method of claim 1, wherein the displaying of the group icon comprises:
  displaying the group icon using symbol images that represent each of the first icon and the second icon.

4. The method of claim 1, further comprising:
  prior to the displaying of the group icon,
  displaying the first icon and the second icon within a specific region of a display of the mobile terminal; and
  forming the group icon which is associated with the first icon and the second icon.

5. The method of claim 4, wherein the forming of the group icon comprises:
  when the first file type and the second file type are the same type, the group icon associated with the first icon and the second icon is formed automatically.

6. The method of claim 4, wherein the forming of the group icon comprises:
  if the first icon and the second icon are selected by a user input, the group icon associated with the first icon and the second icon is formed.

7. A mobile terminal comprising:
  a display configured to display a group icon which is associated with a first icon and a second icon;
  a user input unit configured to receive an input; and
  a control unit configured to:
  determine a group action associated with the first icon and the second icon according to whether a first file type associated with the first icon and a second file type associated with the second icon are a same type or not;
  execute the group action in response to the received input;
  determine the group action as an action that sequentially executes functionality associated with the first icon and the second icon when the first file type and the second file type are the same type, and determines the group action as an action that simultaneously executes functionality associated with the first icon and functionality associated with the second icon when the first file type and the second file type are not the same type.

8. The mobile terminal of claim 7, wherein a menu comprising a list of applications associated with the first icon and the second icon is displayed on the display in response to execution of the group action.

9. The mobile terminal of claim 7, wherein,
  the display displays the group icon using symbol images that represent each of the first icon and the second icon.

10. The mobile terminal of claim 7, wherein,
  prior to the of displaying the group icon,
  the display displays the first icon and the second icon, and the control unit forms the group icon which is associated with the first icon and the second icon.

11. The mobile terminal of claim 10, wherein,
  the control unit forms the group icon associated with the first icon and the second icon automatically when the first file type and the second file type are the same type.

12. The mobile terminal of claim 10, wherein,
  if the user input unit receives the input that selects the first icon and the second icon, the control unit forms the group icon associated with the first icon and the second icon.

* * * * *